(12) United States Patent
Patino et al.

(10) Patent No.: US 7,705,565 B2
(45) Date of Patent: Apr. 27, 2010

(54) METHOD AND SYSTEM FOR WIRELESS CHARGING

(75) Inventors: Joseph Patino, Pembroke Pines, FL (US); Ronald S. Coapstick, Ft. Lauderdale, FL (US)

(73) Assignee: Motorola, Inc., Schaumburg, IL (US)

( * ) Notice: Subject to any disclaimer, the term of this patent is extended or adjusted under 35 U.S.C. 154(b) by 37 days.

(21) Appl. No.: 10/750,593

(22) Filed: Dec. 31, 2003

(65) Prior Publication Data

US 2005/0156569 A1 Jul. 21, 2005

(51) Int. Cl.
*H02J 7/00* (2006.01)
*H02J 7/04* (2006.01)

(52) U.S. Cl. .................. 320/150; 320/108; 320/112; 320/114

(58) Field of Classification Search .............. 320/150, 320/108, 128, 112, 114, 134, 127, 137, 136, 320/149
See application file for complete search history.

(56) References Cited

U.S. PATENT DOCUMENTS

| | | | |
|---|---|---|---|
| 4,731,813 A | 3/1988 | Schroeder | |
| 5,471,128 A | 11/1995 | Patino et al. | |
| 5,600,225 A * | 2/1997 | Goto | 320/108 |
| 5,631,538 A | 5/1997 | Komrsha | |
| 5,734,254 A | 3/1998 | Stephens | |
| 5,963,012 A | 10/1999 | Garcia et al. | |
| 6,025,695 A | 2/2000 | Friel et al. | |
| 6,040,680 A * | 3/2000 | Toya et al. | 320/108 |
| 6,057,668 A * | 5/2000 | Chao | 320/108 |
| 6,184,651 B1 | 2/2001 | Fernandez et al. | |
| 6,320,354 B1 * | 11/2001 | Sengupta et al. | 320/132 |
| 6,819,083 B1 | 11/2004 | Patino et al. | |
| 2002/0175658 A1 * | 11/2002 | Watts et al. | 320/150 |

FOREIGN PATENT DOCUMENTS

| | | |
|---|---|---|
| GB | 2352887 A | 2/2001 |
| JP | 11215727 | 8/1999 |
| KR | 2001-0074405 | 8/2001 |

OTHER PUBLICATIONS

Patent Office of the People's Republic of China, Notification of the First Office Action for Application No. 200480039580.X "Method and System for Wireless Charging" Applicant Motorola, Inc., Feb. 15, 2008, 10 pages.

(Continued)

*Primary Examiner*—Edward Tso
*Assistant Examiner*—Alexis Boateng
(74) *Attorney, Agent, or Firm*—Larry G. Brown

(57) ABSTRACT

The invention concerns a system (100) and method (300) for charging a battery. The method includes the steps of supplying (312) a charging current to a battery (110), sensing (314) the charging current to the battery and selectively signaling (316) an electronic device (118) from the battery to indicate at least one parameter of the battery as the battery is receiving the charging current. As an example, the charging current can be from a wireless charger (116). In addition, the parameter can be, for example, a charging state of the battery or a predetermined current threshold of the charging current.

18 Claims, 4 Drawing Sheets

OTHER PUBLICATIONS

European Patent Office, Supplementary European Search Report for Application No. EP 04 81 5799 Applicant Motorola, Inc., Jun. 18, 2009, 3 pages.

Japan Patent Office, Office Action for Application No. 2006-547526, Nov. 18, 2008, 5 pages.

Japan Patent Office, Decision of Rejection for Application No. 2006-547526 "Method and System for Wireless Charging" Applicant Motorola, Inc., Jun. 9, 2009, 2 pages.

World Intellectual Property Organization, International Search Report for Application No. PCT/US2004/043798, Sep. 1, 2005, 1 page.

* cited by examiner

METHOD AND SYSTEM FOR WIRELESS CHARGING

BACKGROUND OF THE INVENTION

1. Field of the Invention

This invention relates in general to portable electronic devices and more particularly to methods for wirelessly charging such devices.

2. Description of the Related Art

In today's marketplace, there is a plethora of portable electronic devices, many of which are powered by rechargeable batteries. Some manufacturers have begun producing chargers that can wirelessly charge these batteries. In such an arrangement, the charger can include a primary coil, and the rechargeable battery can include a secondary coil. When a time-varying current is applied to the first coil in the charger, a charging current can be generated in the secondary coil. Wireless charging is convenient in that it is unnecessary to couple any wires to the portable electronic device that houses the battery.

Many of the devices that are capable of being wirelessly charged, however, also have receptacles for receiving a charging wire from a conventional charger. In addition, the portable electronic device currently has no way to monitor the charging current from a wireless charger. Thus, the possibility exists that an end user will couple a standard charger to the portable device as it is being wirelessly charged, which may double the charging current. Consequently, the charging indicator, which informs the user of the amount of charge on the battery, may be inaccurate, and even worse, this excess current may damage the components of the portable device.

Even if the user avoids this scenario, the charging indicator may still provide erroneous readings. This disadvantage exists because many portable electronic devices rely on current thresholds to produce the readings of the charging indicator, particularly when the battery reaches its maximum charge voltage but is not yet fully charged. As noted earlier, there is no current way for the portable electronic device to monitor the charging current from a wireless charger.

SUMMARY OF THE INVENTION

The present invention concerns a method for charging a battery. The method includes the steps of supplying a charging current to a battery, sensing the charging current to the battery and selectively signaling an electronic device from the battery to indicate at least one parameter of the battery as the battery is receiving the charging current. As an example, the charging current can be from a wireless charger. In addition, the parameter can be a charging state of the battery or a predetermined current threshold of the charging current.

In one arrangement, the battery can signal the electronic device over an input/output line, and the input/output line can be a preexisting reading conductor. As another example, the preexisting reading conductor can be a thermistor line. The method can also include the steps of disabling a charging circuit in the electronic device and updating a charging indicator of the electronic device. Further, the selectively signaling step can include the step of toggling the input/output line between a high state, a low state and a release state during the signaling step.

The present invention also concerns a system for charging a battery. The system includes a charger and a battery. The charger supplies a charging current to the battery, and the battery includes a charging monitor that senses the charging current and selectively signals an electronic device to indicate at least one parameter of the battery as the battery is receiving the charging current. The system also includes suitable software and circuitry to carry out the processes described above.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION

Figure 1:
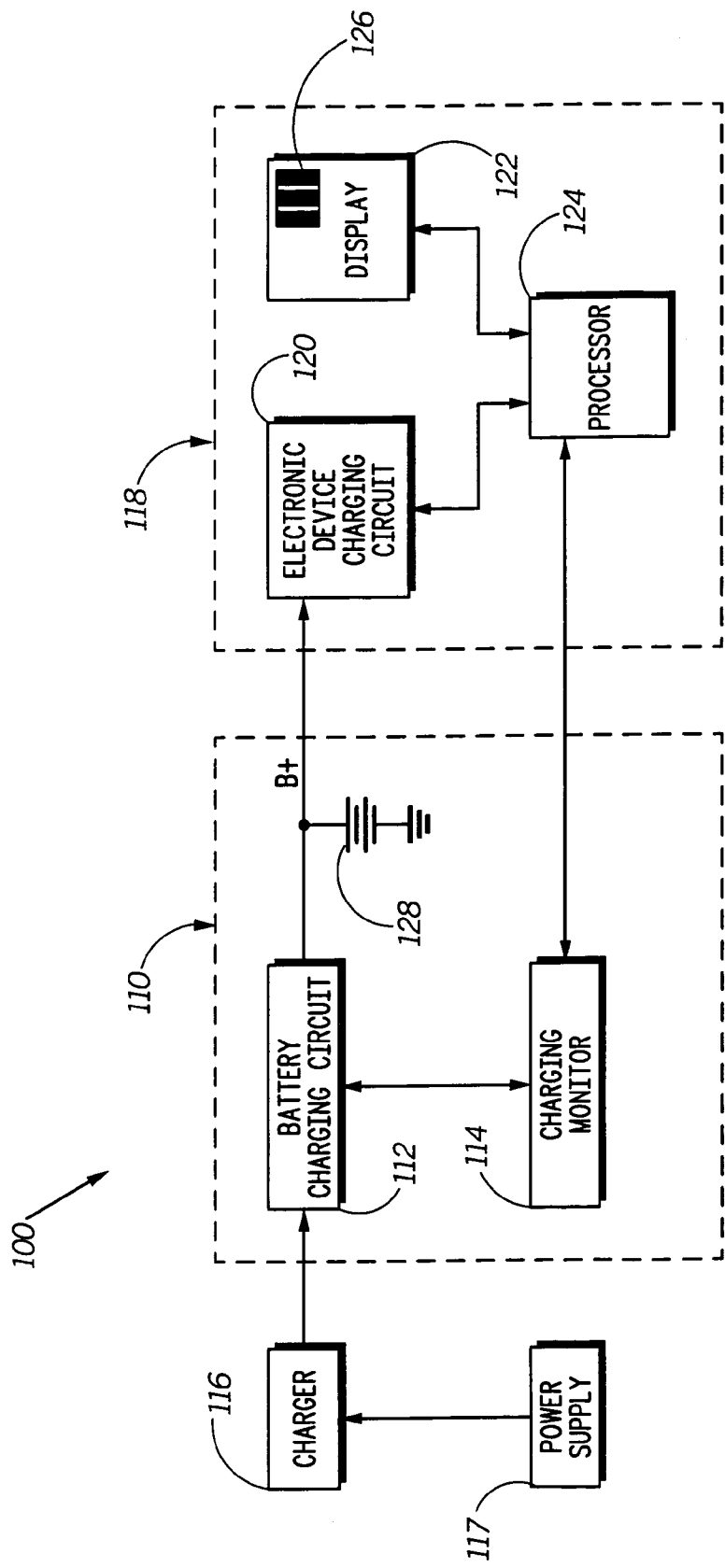
FIG. 1 illustrates a system for charging a battery in accordance with the inventive arrangements.

While the specification concludes with claims defining the features of the invention that are regarded as novel, it is believed that the invention will be better understood from a consideration of the following description in conjunction with the drawing figures, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Referring to FIG. 1, a system 100 for charging a battery 110 is shown. The battery 110 can include a battery charging circuit 112 and a charging monitor 114. In addition to the battery 110, the system 100 can include a charger 116, a power supply 117 and an electronic device 118. The battery 110 can provide power to the electronic device 118, and the electronic device 118 can be a cellular telephone, a two-way radio, a personal digital assistant or a messaging device or any other suitable unit that can receive power from the battery 110.

The electronic device 118 can include an electronic device charging circuit 120, a display 122 and a processor 124, which can be coupled to the electronic device charging circuit 120 and the display 122. Additionally, the electronic device charging circuit 120 can direct a charging current to the battery 110 if a charging current is being fed to the electronic device 118. The display 122 can include a charging indicator 126, which can be used to indicate to a user the level of charge of the battery 110.

The charger 116 can supply a charging current to the battery charging circuit 112, which can be used to charge one or more cells 128 of the battery 110. In one arrangement, the charging monitor 114 can sense and monitor the charging current and the charging voltage on the battery 110 and can manipulate the battery charging circuit 112 to control both of them. Moreover, the charging monitor 114 can selectively signal the processor 124 of the electronic device 118 to indicate to the electronic device 118 at least one parameter of the battery 110 as the battery 110 is receiving the charging current. For example, the charging monitor 114 can signal the processor 124 of the electronic device 118 to indicate the status of a charging state of the battery 110., i.e., whether the battery 110 is receiving a charging current from the charger 116. The charging monitor 114 can also signal the processor 124 to indicate when the charging current has reached a predetermined threshold. These features may be useful, particularly if the processor 124 of the electronic device 118 is unable to monitor the charging current supplied by the charger 116.

In response to the receipt of these signals, the processor 124 can be programmed to perform several functions. As an example, if the charging monitor 114 signals the processor 124 that the battery 110 is currently receiving a charging current from the charger 116, the processor 124 can disable the electronic device charging circuit 120. This process can prevent the battery from receiving excessive charging current. As another example, if the charging monitor 114 signals the processor 124 that the charging current supplied to the battery charging circuit 112 has reached a predetermined threshold, the processor 124 can update the charging indicator 126 of the display 122. Through this input, a user can obtain a more accurate reading of the charge level of the battery 110.

Figure 2:
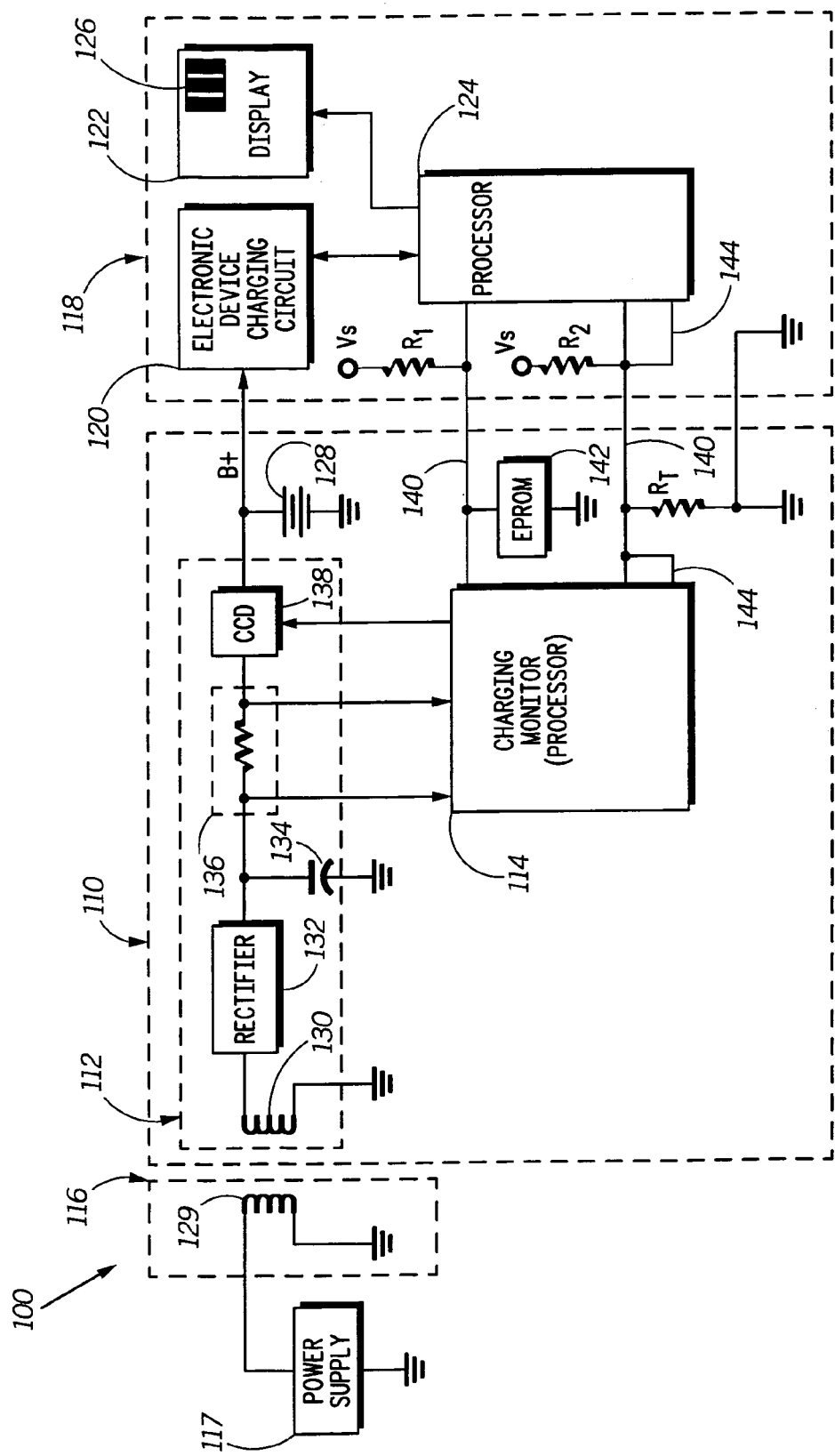
FIG. 2 illustrates in more detail the system of FIG. 1 in accordance with the inventive arrangements.

Referring to FIG. 2, the system 100 is shown in more detail. Specifically, the charger 116 can include a first coil 129, and the battery charging circuit 112 can include a second coil 130. The battery charging circuit 112 can also include a rectifier 132, a smoothing capacitor 134, a current sensor 136 and a current control device 138, which can be coupled to the cells 128. The current sensor 136 and the current control device 138 can be coupled to the charging monitor 114, and the charging monitor 114 can control the operation of the current control device 138. As pictured in FIG. 2, the charger 116 can be a wireless charger. That is, when the power supply 117 supplies current to the charger 116, the first coil 129 can generate a charging current in the second coil 130 of the battery charging circuit 112. Of course, it is understood that the invention is not limited in this regard, as the charger 116 can also be a conventional charger in which charging current is supplied through a charging wire.

In another arrangement, the charging monitor 114 can be a processor. In this example, the charging monitor 114 can include one or more analog-to-digital converters (not shown) for digitally converting analog signals. For example, the inputs from the current sensor 136 can be coupled to A/D converters of the charging monitor 114.

The battery 110 can also have one or more input/output lines 140, which can be coupled between the charging monitor 114 and the processor 124 of the electronic device 118. In one arrangement, these input/output lines 140 can be preexisting reading conductors. A preexisting reading conductor can be any conductor that is incorporated into the battery 110 and is initially designed to facilitate charging or operation of the battery 110 by permitting a processor to read any suitable measurement.

For example, the battery 110 can include a thermistor $R_T$. The thermistor $R_T$, a pull-up resistor $R_2$ and a voltage supply $V_S$ can form a voltage divider. As is known in the art, as the temperature of a battery changes, the resistance of a thermistor can correspondingly vary, which, in this case, can modify the voltage that the processor 124 or the charging monitor 114 can read on the relevant input/out line 140, i.e., the preexisting reading conductor. This change in voltage allows the processor 124 or the charging monitor 114 to determine the temperature of the battery 110.

As another example, the battery 110 can include an erasable programmable read-only memory (EPROM) 142, which can be coupled to another resistor $R_1$ and the voltage supply $V_S$. As is known in the art, the processor 124 (or the charging monitor 114) can prompt the EPROM 142 to enable the processor 124 (or the charging monitor 114) to read, for example, charging information about the battery 110 stored in the EPROM 142.

The input/output line 140 that serves as the preexisting reading conductor for the thermistor $R_T$ can include one or more branches 144, which can be coupled to A/D converters in the charging monitor 114 and the processor 124 of the electronic device 118. These branches 144 can facilitate the voltage readings associated with the thermistor $R_T$.

To demonstrate the operation of the system 100, reference will be made to FIG. 3, which shows a method 300 for charging a battery. Although the method 300 of FIG. 3 and the system 100 of FIGS. 1 and 2 are used to describe one another, it is understood that the inventive arrangements can be practiced in any other suitable system. At step 310, the method 300 can begin. At step 312, a charging current can be supplied to a battery. For example, referring to FIG. 2 and as noted earlier, the charger 116 can be a wireless charger, and a charging current can be induced in the second coil 130 of the battery charging circuit 112. The rectifier 132 can rectify the charging current, and the smoothing capacitor 134 can reduce the fluctuation of the charging current.

Referring back to FIG. 3, at step 314, the charging current to the battery can be sensed. For example, referring back to FIG. 2, the charging monitor 114 can sense the charging current through the current sensor 136. By sensing the charging current through the current sensor 136, the charging monitor 114 can initially detect that the battery 110 is receiving a charging current from the charger 116 and can determine its magnitude. The charging monitor 114 can also control the amount of charging current flowing to the cells 128 of the battery 110 by manipulating the current control device 138. For example, as is known in the art, when the voltage on the battery 110 reaches the maximum charge voltage of the battery 110, the charging monitor 114 can reduce the magnitude of the charging current by operating the current control device 138. In one particular arrangement, the current control device 138 can be a field effect transistor (FET), although other suitable components are within contemplation.

Figure 3:
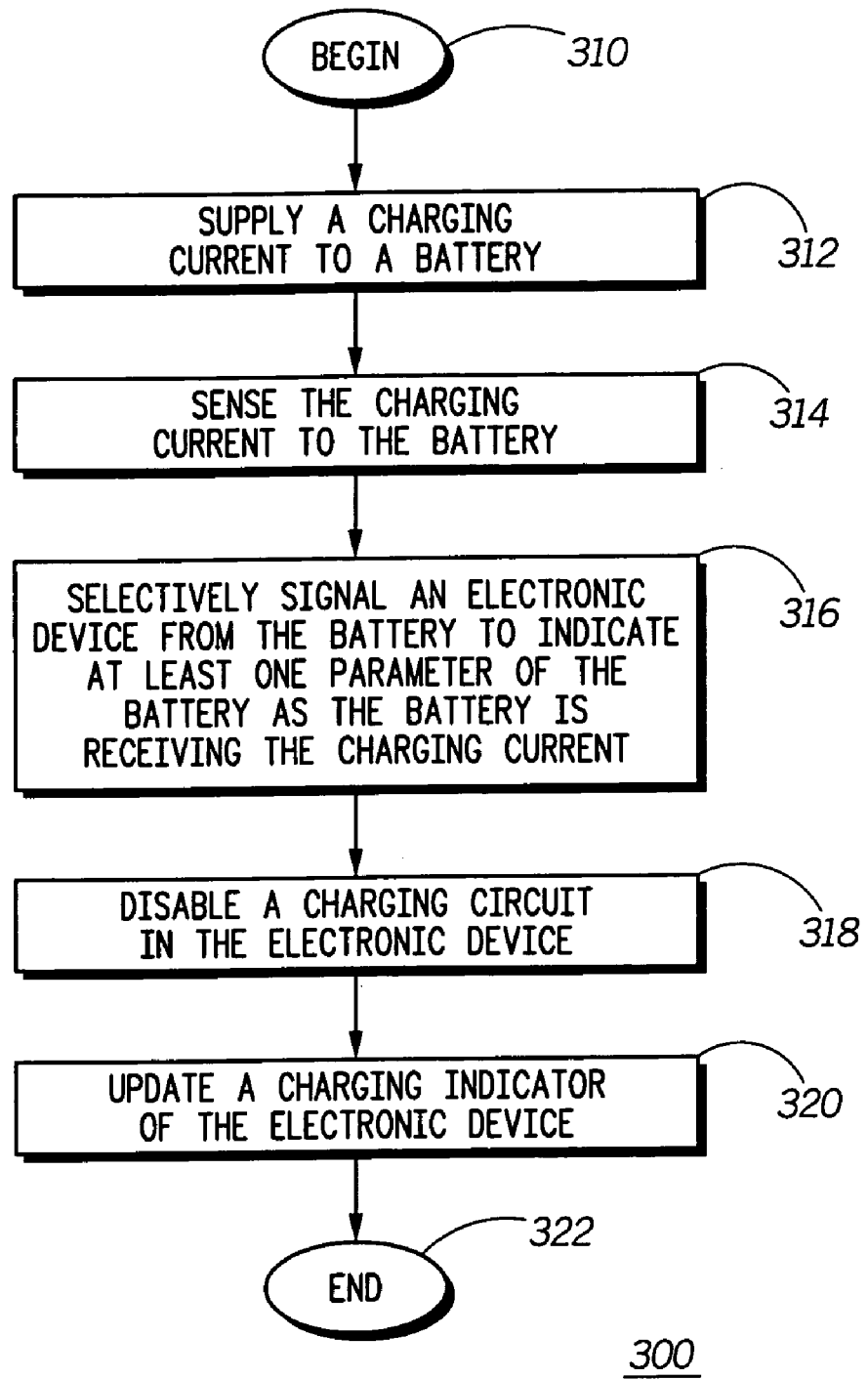
FIG. 3 illustrates a method for charging a battery in accordance with the inventive arrangements.

Referring back to the method 300 of FIG.3, the battery can selectively signal the electronic device to indicate at least one parameter of the battery as the battery is receiving the charging current, as shown at step 316. At step 318, a charging circuit in the electronic device can be disabled, and at step 320, a charging indicator of the electronic device can be updated. Examples will be illustrated below in reference to FIG. 2 in which the parameters of the battery are a charging state of the battery (whether the battery is being charged) and a predetermined current threshold of the charging current. As an example, the selectively signaling step 316 can include toggling an input/output line between high and low states, as will also be described below.

When the charging monitor 114 senses the charging current through the current sensor 136, the charging monitor 114 can pull to a high state one of the input/output lines 140. For example, the charging monitor 114 can pull to a high state the input/output line 140 that also serves as the thermistor $R_T$ conductor. This high state can have a value that is in the high end of the voltage range for the thermistor $R_T$ voltage divider, although other suitable values can be used. In response, an interrupt can occur at the processor 124 of the electronic device 118, and the processor 124 can disable the electronic device charging circuit 120. This step can prevent the battery 110 from receiving excessive charging current should a user accidentally place the battery 110 on the charger 116 while the electronic device 118 is coupled to another charger.

As is known in the art, when a battery is being charged, the voltage of the battery is monitored first and when a battery reaches its maximum charge voltage, the charging current can be monitored. Thus, many times the charging current is monitored to determine when the battery is fully charged. In this example, the charging monitor 114 can begin to reduce the magnitude of the charging current through the current control device 138 when it detects that the battery 110 has reached its maximum charge voltage. The charging monitor 114 can continually reduce the value of the charging current until the battery 110 is fully charged. Although the processor 124 of the electronic device 118 may monitor the voltage of the battery 110 as it is being charged, it may not be able to track the charging current. As a result, the processor 124 may not be able to determine when the battery 110 is fully charged when the battery 110 receives a charging current from the charger 116.

In accordance with the inventive arrangements, when the magnitude of the charging current reaches a predetermined current threshold during this process, the charging monitor 114 can pull to a low state the appropriate input/output line 140. The predetermined current threshold can be a current magnitude that indicates that the battery 110 is fully or at least substantially charged to capacity. As an example, the charging monitor 114 can pull to a low state the input/output line 140 associated with the thermistor $R_T$. This step can also cause an interrupt to occur at the processor 124 of the electronic device 118. The value for the low state can be in the low end of the voltage range for the thermistor $R_T$ voltage divider, although other suitable values can be employed. In response, the processor 124 can update the charging indicator 126 of the display 122. This update can indicate to a user that the battery 110 is fully charged.

It must be noted that the invention is not limited to the examples presented above. For example, any suitable input/output line, including the input/output line 140 associated with the EPROM 142 can be used to signal the processor 124 of the electronic device 118. Of coursed, the input/output lines 140 can be incorporated into any other suitable preexisting conductor. Moreover, the charging monitor 114 is not limited to being a processor, as presented above. Those of ordinary skill in the art will appreciate that the charging monitor 114 can be comprised of any suitable combination of comparators and switches to carry out the inventive functions. It is also understood that the battery 110 can be charged without being attached to the electronic device 118. In this arrangement, the appropriate pull-up resistors for the thermistor $R_T$ and EPROM 142 lines can be incorporated in the battery 110.

Figure 4:
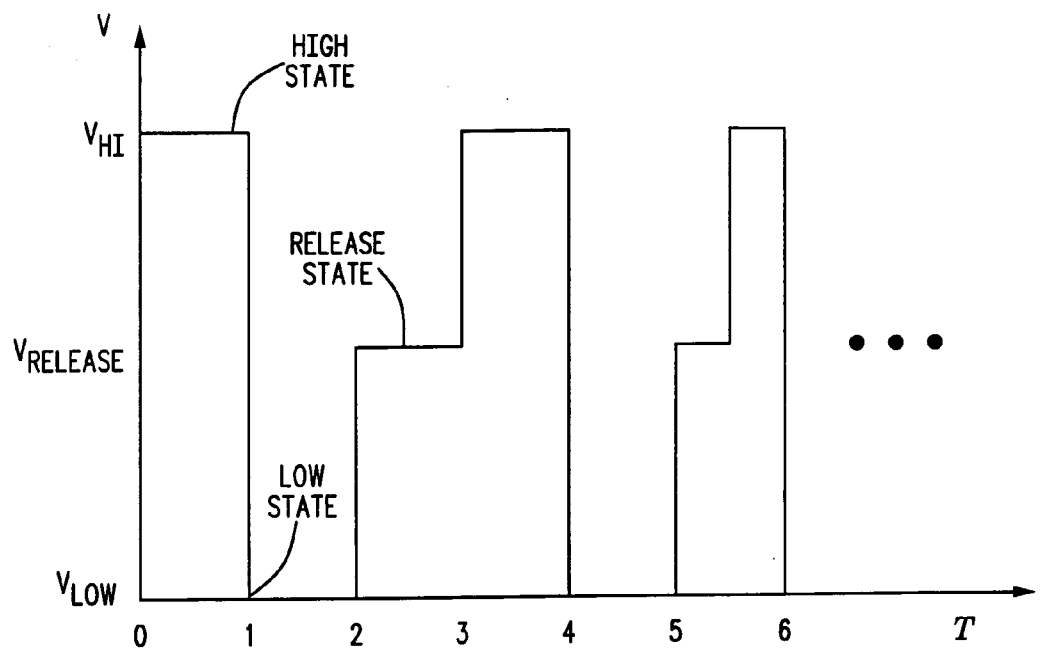
FIG. 4 illustrates a graph of a signal on an input/output line in accordance with the inventive arrangements.
Figure 5:
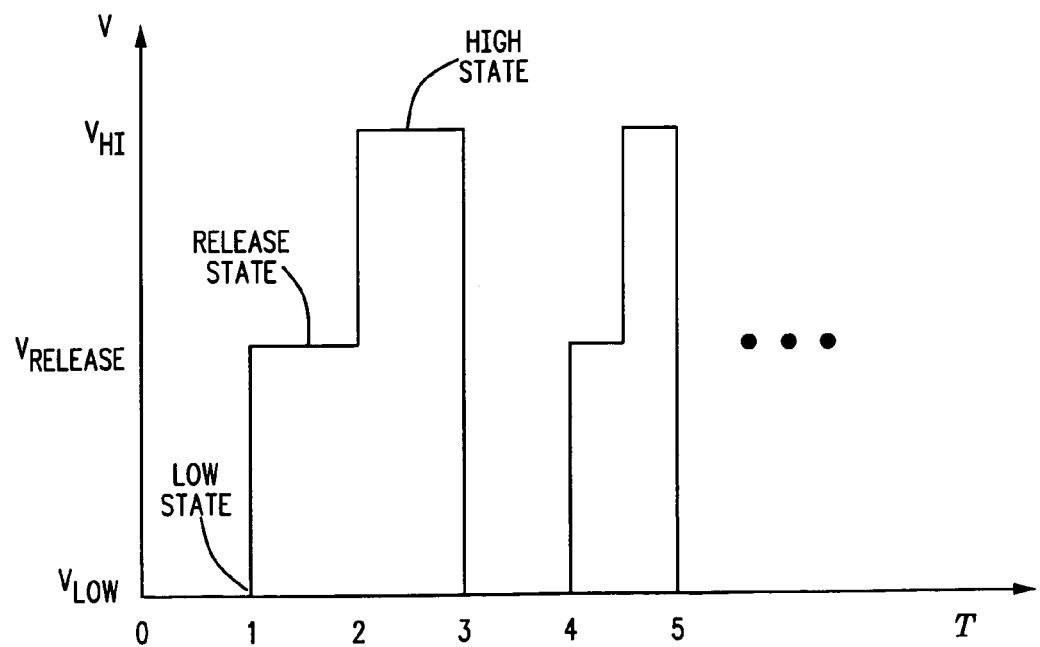
FIG. 5 illustrates a graph of another signal on an input/output line in accordance with the inventive arrangements.

As explained above, during the selectively signaling step (see step 316 of FIG. 3), an input/output line can be toggled between high and low states. In another arrangement, the selectively signaling step can include the step of toggling the input/output line between a high state, a low state and a release state. Referring to FIGS. 4 and 5, graphs representing examples of this toggling process are illustrated. Specifically, these voltage versus time graphs demonstrate the signal on an input/output line being pulled between high, low and release states. The voltage represents the voltage on an input/output line, and the numbers on the time axis represent predefined times.

For example, referring to FIGS. 2 and 4, the input/output line 140 (such as the one associated with the thermistor $R_T$ line) can be pulled to and can currently be at a high state (see T=0). The charging monitor 114 can pull to a low state this input/output line 140, even though the charging current has not yet reached the predetermined current threshold (see T=1). The charging monitor 114 can subsequently release the input/output line 140 (see T=2). That is, the charging monitor 114 can toggle the input/output line 140 to a release state. During the release state, the charging monitor 114 (or any other suitable component) can read the voltage associated with the thermistor $R_T$ to determine the temperature of the battery 110. This voltage associated with the thermistor $R_T$ can have a value somewhere between the high and low states. Subsequently, the charging monitor 114 can pull back to a high state the input/output line 140 (see T=3).

As shown in the graph of FIG. 4, this operation can be repeated any suitable number of times. Repeating this process can enable the charging monitor 114 to monitor the temperature of the battery 110 as the battery is being charged. Moreover, the processor 124 of the electronic device 118 can distinguish between the proper charging of the battery 110 and an inadvertent shorting of the thermistor $R_T$ line to a B+ input (see FIG. 2).

Referring to FIGS. 2 and 5, another example of this toggling process will be explained. Here, the charging current can already have reached the predetermined current threshold. As such, the input/output line 140, e.g., the input/output line 140 associated with the thermistor $R_T$, can be pulled to a low state (see T=0). The charging monitor 114 can release the input/output line 140, and the charging monitor 114 can determine the temperature of the battery 110 (see T=1). Next, the charging monitor 114 can pull to a high state the input/output line 140, where it will remain for a certain period of time (see T=2). The charging monitor 114 can then pull back to a low state the input/output line 140 (see T=3). Similar to the steps described in relation to FIG. 4, this operation can be repeated and allows the charging monitor 114 to determine the temperature of the battery 110. Also, the processor 124 of the electronic device 118 can distinguish between proper charging of the battery 110 and an inadvertent shorting between the thermistor $R_T$ line and ground.

It is understood, however, that other techniques can be used to help the charging monitor 114 continue to monitor the temperature of the battery 110. Moreover, other processes can be employed to help the processor 124 distinguish between accidental shorts.

In addition, while the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for charging a battery, comprising the steps of:
supplying a charging current from a first charger to a battery through a first charging circuit, wherein the battery includes the first charging circuit and provides power to an electronic device;
sensing the charging current to the battery;
selectively signaling the electronic device from the battery to indicate at least one parameter of the battery as the battery is receiving the charging current; and
in response to selectively signaling the electronic device, disabling a second charging circuit, wherein the electronic device includes the second charging circuit and the second charging circuit is capable of directing charging current to the battery if charging current is being fed to the electronic device from another charger.

2. The method according to claim 1, wherein the charging current from the first charging circuit is from a wireless charger.

3. The method according to claim 1, wherein the parameter is at least one of a charging state of the battery and a predetermined current threshold of the charging current from the first charging circuit.

4. The method according to claim 1, wherein the battery signals the electronic device over an input/output line and wherein the input/output line is a preexisting reading conductor.

5. The method according to claim 4, wherein the preexisting reading conductor is a thermistor line.

6. The method according to claim 1, further comprising the step of updating a charging indicator of the electronic device.

7. The method according to claim 4, wherein the selectively signaling step comprises the step of toggling the input/output line between a high state, a low state and a release state during the signaling step.

8. A method of wirelessly charging a battery, comprising the steps of:
supplying a charging current from a wireless charger to a battery;
sensing the charging current;
selectively toggling between high, release, and low states an input/output line between an electronic device and the battery to indicate to the electronic device at least one parameter of the battery as the battery is receiving the charging current, wherein the release state is a value that is between the high and low states.

9. A system for charging a battery, comprising:
an electronic device;
a first charger; and
a battery, wherein the battery supplies power to the electronic device, wherein the first charger supplies a charging current to the battery through a first charging circuit included in the battery and wherein the battery includes a charging monitor that senses the charging current and selectively signals the electronic device to indicate at least one parameter of the battery as the battery is receiving the charging current, wherein the electronic device includes a second charging circuit and is designed to disable the second charging circuit in response to the signal indicating the parameter of the battery, wherein the second charging circuit is capable of directing charging current to the battery if charging current is being fed to the electronic device from a second charger.

10. The system according to claim 9, wherein the charger is a wireless charger and the charging monitor is a processor.

11. The system according to claim 9, wherein the parameter is at least one of a charging state of the battery and a predetermined current threshold of the charging current of the first charging circuit.

12. The system according to claim 9, further comprising an input/output line between the battery and the electronic device, wherein the charging monitor signals the electronic device over the input/output line and wherein the input/output line is a preexisting reading conductor.

13. The system according to claim 12, wherein the preexisting reading conductor is a thermistor line.

14. The system according to claim 9, wherein the charging monitor causes a charging indicator of the electronic device to be updated when the charger supplies the charger current to the battery.

15. The system according to claim 12, wherein the charging monitor toggles the input/output line between a high state, a low state and a release state when the charging monitor selectively signals the electronic device.

16. A system for wirelessly charging a battery, comprising:
a wireless charger;
a battery having a charging monitor; and
an input/output line for coupling between the battery and an electronic device, wherein the wireless charger supplies charging current to the battery and wherein the charging monitor selectively toggles between high, release, and low states the input/output line to indicate to the electronic device at least one parameter of the battery as the battery is receiving the charging current, wherein the release state is a value that is between the high and low states.

17. A battery, comprising:
a first charging circuit for receiving a charging current from a first charger; and
a charging monitor coupled to the first charging circuit, wherein the charging monitor senses the charging current received by the first charging circuit and selectively signals an electronic device powered by the battery to indicate at least one parameter of the battery as the battery is receiving the charging current and wherein the electronic device uses the signal to disable a second charging circuit, wherein the electronic device includes the second charging circuit and the second charging circuit is capable of directing charging current to the battery if charging current is being fed to the electronic device from a second charger.

18. An electronic device, comprising:
a processor;
an input/output line coupled to the processor;
a charging circuit that receives power from a first charger; and
a charging indicator;
wherein the processor is operable to detect signals from a battery having a second charging circuit over the input/output line, wherein the second charging circuit receives power from a second charger, and in response to the detection of the signals, the processor is further operable to disable the second charging circuit.

* * * * *